(12) United States Patent
Greenspan et al.

(10) Patent No.: US 9,830,051 B1
(45) Date of Patent: Nov. 28, 2017

(54) METHOD AND APPARATUS FOR PRESENTING A BREADCRUMB TRAIL FOR A COLLABORATIVE SESSION

(71) Applicant: CA, Inc., Islandia, NY (US)

(72) Inventors: Steven L. Greenspan, Scotch Plains, NJ (US); Michael C. Roberts, McKinney, TX (US); Maria C. Velez-Rojas, San Jose, CA (US); Serge Mankovskii, San Ramon, CA (US)

(73) Assignee: CA, Inc., New York, NY (US)

( * ) Notice: Subject to any disclaimer, the term of this patent is extended or adjusted under 35 U.S.C. 154(b) by 233 days.

(21) Appl. No.: 13/799,726

(22) Filed: Mar. 13, 2013

(51) Int. Cl.
- *G06F 3/0484* (2013.01)
- *G06F 3/0482* (2013.01)
- *G06Q 10/10* (2012.01)

(52) U.S. Cl.
CPC .......... *G06F 3/0484* (2013.01); *G06Q 10/10* (2013.01)

(58) Field of Classification Search
CPC .................................. G06F 3/0484
USPC .......................................... 715/753
See application file for complete search history.

(56) References Cited

U.S. PATENT DOCUMENTS

| | | | | |
|---|---|---|---|---|
| 8,706,685 B1* | 4/2014 | Smith et al. | ................... | 707/608 |
| 8,739,044 B1* | 5/2014 | Varadarajan | ................... | 715/751 |
| 2004/0221309 A1* | 11/2004 | Zaner et al. | ................... | 725/46 |
| 2009/0094190 A1* | 4/2009 | Stephens | ........................ | 707/2 |
| 2009/0164946 A1* | 6/2009 | Liddington | ................... | 715/853 |
| 2009/0327961 A1* | 12/2009 | De Vorchik | ...... G06F 17/30126 715/825 |
| 2010/0223223 A1* | 9/2010 | Sandler et al. | ................. | 706/50 |
| 2010/0228825 A1* | 9/2010 | Hegde et al. | ................. | 709/204 |
| 2011/0267419 A1* | 11/2011 | Quinn et al. | ............... | 348/14.08 |

FOREIGN PATENT DOCUMENTS

WO   WO 2010054465 A1 * 5/2010

OTHER PUBLICATIONS

Lima-Gomes, R. (2005). Colab: A flexible Collaborative web browsing tool. Advanced Information Networking and Applications, 1, 501-506. Retrieved Jan. 5, 2015, from http://ieeexplore.ieee.org/stamp/stamp.jsp?arnumber=1423540.*
Cbuops, "How to Share Applications and Files in WebEx", Published on Mar. 7, 2011, Publisher: Youtube, https://www.youtube.com/watch?v=eRUQWk9SAn8.*

* cited by examiner

*Primary Examiner* — Abdullah Al Kawsar
*Assistant Examiner* — David Luu
(74) *Attorney, Agent, or Firm* — Coats & Bennett, PLLC (57) ABSTRACT

According to an example computer-implemented method, shared media content is presented to a plurality of users during a collaborative session, with the session including a plurality of events. A breadcrumb trail of events occurring during the collaborative session is created. For each of the events, a descriptor is determined for the event, and the event is tagged in the breadcrumb trail with the descriptor. Responsive to receipt of a descriptor selection, a filtered breadcrumb trail including only events tagged with the selected descriptor is presented.

33 Claims, 9 Drawing Sheets

METHOD AND APPARATUS FOR PRESENTING A BREADCRUMB TRAIL FOR A COLLABORATIVE SESSION

TECHNICAL FIELD

The present disclosure relates to collaborative sessions, and more specifically relates to presenting a breadcrumb trail for a collaborative session.

BACKGROUND

As the Internet continues to grow in popularity, online collaborative tools have become a popular way to share media content amongst a plurality of viewers. Some examples of these tools include WEBEX and LIVE MEETING. In one common application, these tools are used to share a desktop of a single presenter to a plurality of viewers for sharing a slide-based presentation. The viewers may be permitted to assume control of the presentation to contribute content, and in doing they can also become presenters themselves. Becoming a presenter can include remotely controlling the previous presenter's machine, or can include the new presenter sharing their own desktop for other viewers to view, for example.

SUMMARY

According to one aspect of the present disclosure a computer-implemented method comprises presenting shared media content to a plurality of users during a collaborative session, wherein the session includes a plurality of events. A breadcrumb trail of events occurring during the collaborative session is created. For each of the events, a descriptor for the event is determined, and the event is tagged in the breadcrumb trail with the descriptor. Responsive to receipt of a descriptor selection, a filtered breadcrumb trail is presented that includes only events tagged with the selected descriptor.

According to another aspect of the present disclosure a computing device comprises a transceiver operative to communicate with a plurality of users via remote computing devices of the plurality of users, and also comprises a controller. The controller is configured to present shared media content to the plurality of users during a collaborative session, wherein the session includes a plurality of events. The controller is further configured to create a breadcrumb trail of events occurring during the collaborative session. The controller is further configured to determine, for each of the events, a descriptor for the event, and tag the event in the breadcrumb trail with the descriptor. Responsive to receipt of a descriptor selection, the controller presents a filtered breadcrumb trail including only events tagged with the selected descriptor.

According to another aspect of the present disclosure, a computer program product comprises a computer readable storage medium having computer readable program code embodied therewith. The computer readable program code comprises computer readable program code configured to present shared media content to a plurality of users during a collaborative session, wherein the session includes a plurality of events. The computer readable program code further comprises computer readable program code configured to create a breadcrumb trail of events occurring during the collaborative session. The computer readable program code further comprises computer readable program code configured to determine, for each of the events, a descriptor for the event, and tag the event in the breadcrumb trail with the descriptor. The computer readable program code further comprises computer readable program code configured to present a filtered breadcrumb trail including only events tagged with the selected descriptor, responsive to receipt of a descriptor selection.

Of course, the present invention is not limited to the above features and advantages. Indeed, those skilled in the art will recognize additional features and advantages upon reading the following detailed description, and upon viewing the accompanying drawings.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a non-transitory computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Breadcrumb trails are a common navigation aid for websites. Some breadcrumb trails inform a user where they are in a website hierarchy and/or give information that categorizes a currently visited page. For example, assume breadcrumb trail "HOMEPAGE>SECTION PAGE>SUB-SECTION PAGE" is present on the "SUB-SECTION PAGE" of a given website." The breadcrumb trail indicates that "SUB-SECTION PAGE" falls within the "SECTION PAGE" container, which in turn falls within the "HOMEPAGE" container. Moreover, each of "HOMEPAGE" and "SECTION PAGE" may be used as hyperlinks to their respective container pages. Other breadcrumb trails indicate a path that a user has taken to arrive at a given page. For example, consider the breadcrumb trail "HELP>PERSONALIZED RESULTS>HOW TO PERFORM TASK." In this example a user visited the "HELP" page, then obtained personalized results (perhaps through a search) and then visited a "HOW TO PERFORM TASK" web page. Thus, breadcrumb trails are often used to provide a path to a currently viewed page, and to let users return to an earlier page and/or explore the information architecture or semantic categories of a website.

Figure 1:
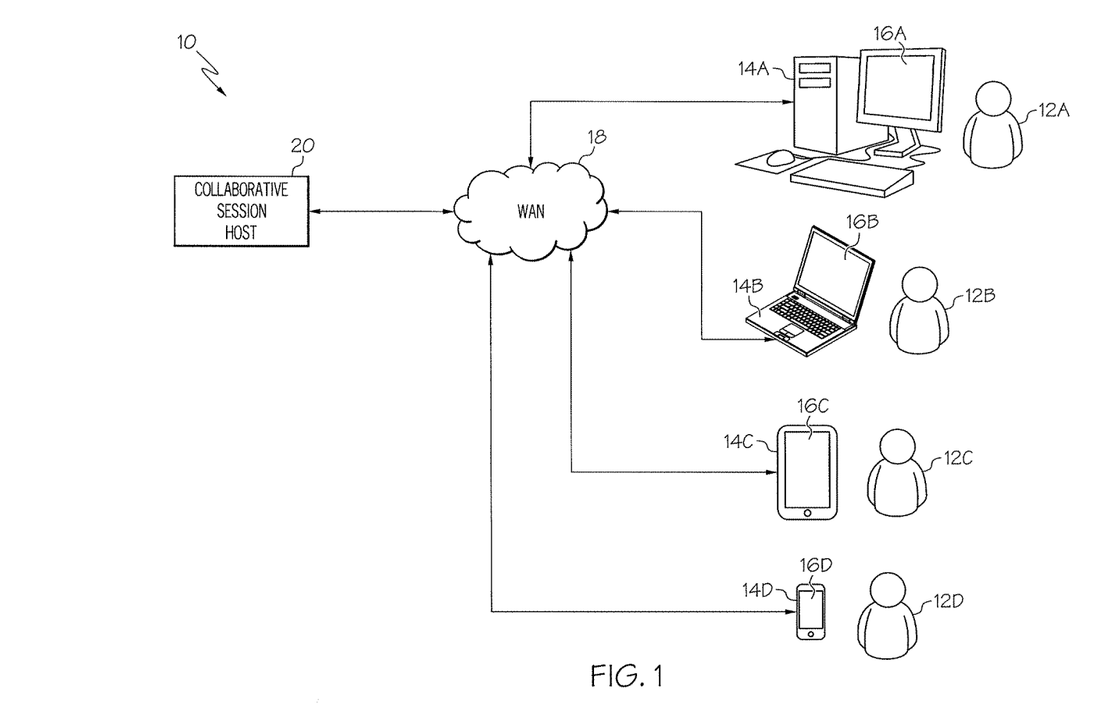
FIG. 1 is a block diagram of one embodiment of a network supporting a collaborative session.

FIG. 1 is a block diagram of one embodiment of a network 10 supporting a collaborative session between a plurality of users 12A-D. Each collaborative user participates in the collaborative session using their respective remote computing device 14A-D. These computing devices may include, for example, a desktop computer 14A, laptop computer 14B, tablet computer 14C, and smartphone 14D. In the embodiment of FIG. 1, each of the computing devices 14 is "remote" in that they are separate machines from a collaborative session host 20, and may optionally also be remotely located. Each computing device 14 includes a respective display 16. The devices 14 communicate through a network 18 with the collaborative session host 20. In one or more embodiments the network 18 is a wide area network (WAN) such as the Internet. In some embodiments, however, a local area network (LAN) may be used.

The collaborative session host 20 is connected to the plurality of remote user computing devices 14, and facilitates the collaborative session and breadcrumb trail creation. The collaborative session may include using a shared collaborative tool on the host 20, sharing a desktop of the host 20, or alternating between sharing desktops of the various computing devices 14A-D, for example.

Figure 2:
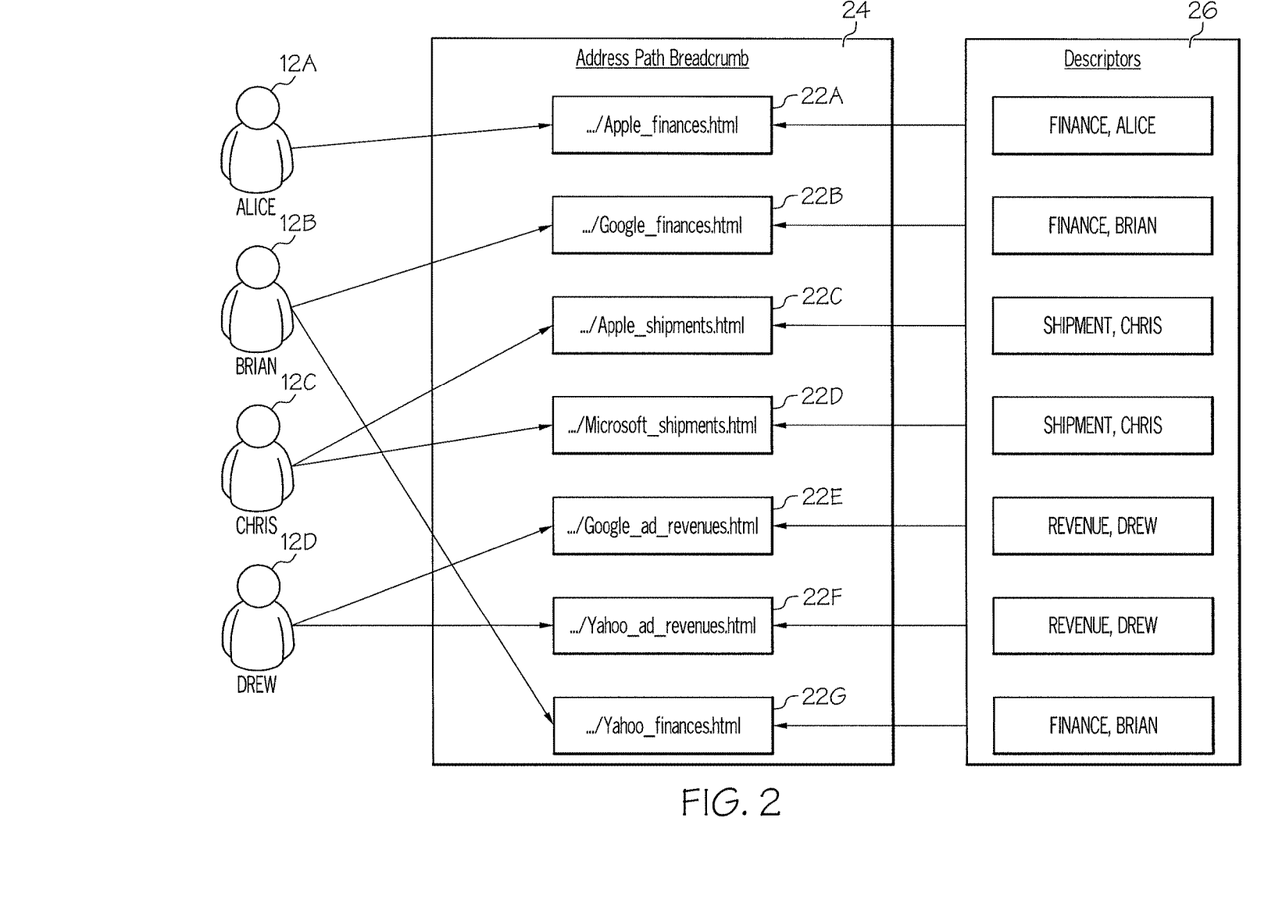
FIG. 2 illustrates the tagging of events in a breadcrumb trail with descriptors.

FIGS. 2-5 illustrate various breadcrumb trail creation features stemming from a collaborative session in which users 12A-D browse to a series of webpages. Each web page visit constitutes an event within the collaborative session. Referring to FIG. 2, the web browsing activity of this collaborative session includes the following:

Alice (user 12A) visits "Apple_finances.html" (event 22A);
 Brian (user 12B) visits "Google_finances.html" (event 22B);
 Chris (user 12C) visits "Apple_shipments.html" (event 22C);
 Chris visits "Microsoft_shipments.html" (event 22D);

Drew (user 12D) visits "Google_ad_revenues.html" (event 22E);

Drew visits "Yahoo_ad_revenues.html" (event 22F); and Brian visits "Yahoo_finances.html" (event 22G).

As the users 12A-D visit these pages, the breadcrumb trail 24 of the events 22A-G is dynamically created. As part of this creation each event 22 may be time-stamped. A plurality of descriptors 26 are dynamically determined for each of the events 22A-G and are used to tag the events 22 in the breadcrumb trail 24 (reference numeral 26 is used to refer generally to all descriptors herein). In the embodiment of FIG. 2, each descriptor 26 is indicative of the media content of its associated event, or a user that initiated the event. For example, the descriptors "FINANCES" and "ALICE" are dynamically determined for event 22A and are used to tag event 22A. The descriptor "FINANCES" describes the content of webpage "Apple_finances.html" and the descriptor "ALICE" indicates user 12A who initiated the event. The events above are listed below with their associated descriptors:

Alice visits "Apple_finances.html" (event 22A)—Descriptors: Apple, Finance, Alice;

Brian visits "Google_finances.html" (event 22B)—Descriptors: Google, Finance, Brian;

Chris visits "Apple_shipments.html" (event 22C)—Descriptors: Apple, Shipment, Chris;

Chris visits "Microsoft_shipments.html" (event 22D)—Descriptors: Microsoft, Shipment, Chris;

Drew visits "Google_ad_revenues.html" (event 22E)—Descriptors: Google, Ad Revenues, Drew;

Drew visits "Yahoo_ad_revenues.html" (event 22F)—Descriptors: Yahoo, Ad Revenues, Drew; and Brian visits "Yahoo_finances.html" (event 22G)—Descriptors: Yahoo, Finance, Brian.

Figure 3:
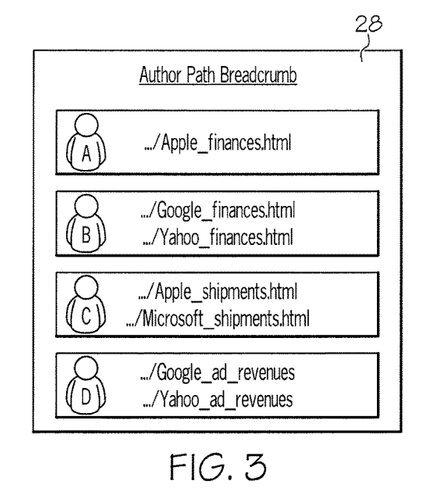
FIGS. 3-5 illustrate example consolidated breadcrumb trails.
Figure 4:
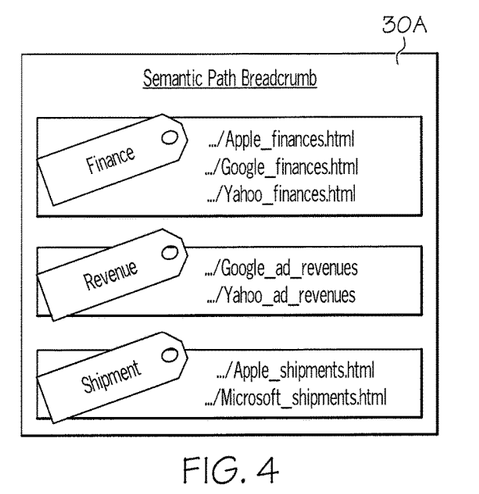
Figure 5:
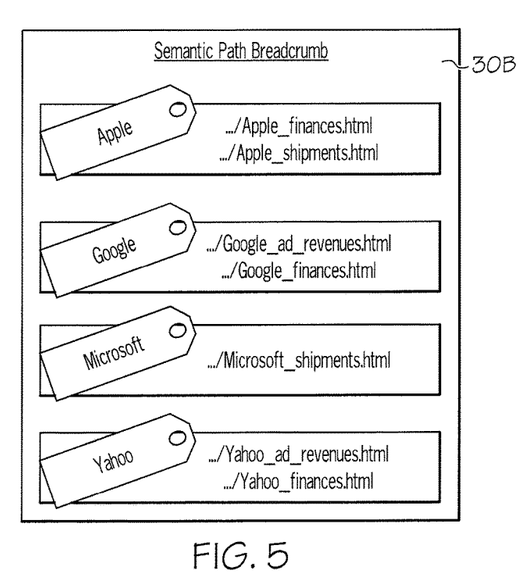

In one or more embodiments, the host 20 is configured to present a consolidated breadcrumb trail in which events for multiple descriptors are presented but are consolidated into groups according to descriptors of a selected descriptor category. Examples of this are shown in FIGS. 3-5. In the example of FIG. 3, a consolidated author path breadcrumb trail 28 is presented that indicates the event sequence of each user 12A-D (see FIG. 3). In the example of FIG. 4, a consolidated semantic path breadcrumb trail 30A is presented that groups each event according to a first descriptor category of "concept" (e.g., "FINANCE" and "REVENUE"). In the example of FIG. 5, a consolidated semantic path breadcrumb trail 30B is presented that groups each event according to a descriptor category of "vendor" (e.g., Apple, Google, Microsoft, etc.). The presenting of the consolidated breadcrumb trails 28, 30A-B may be performed responsive to user selection of the descriptor category in question. For example, the author path breadcrumb trail 28 may be presented responsive to user selection of a descriptor category of "username."

Figure 6:
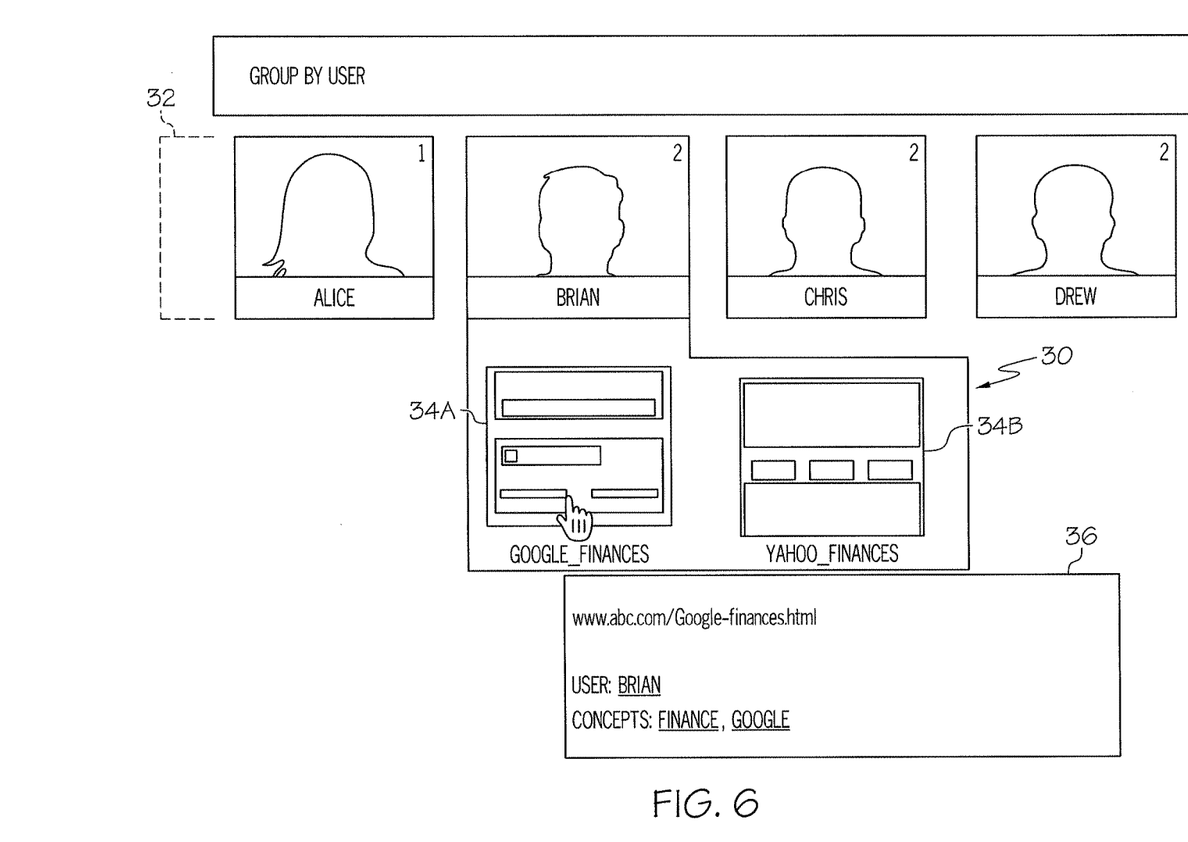
FIG. 6 illustrates an example filtered breadcrumb trail that has been filtered based on a descriptor selection.
Figure 7:
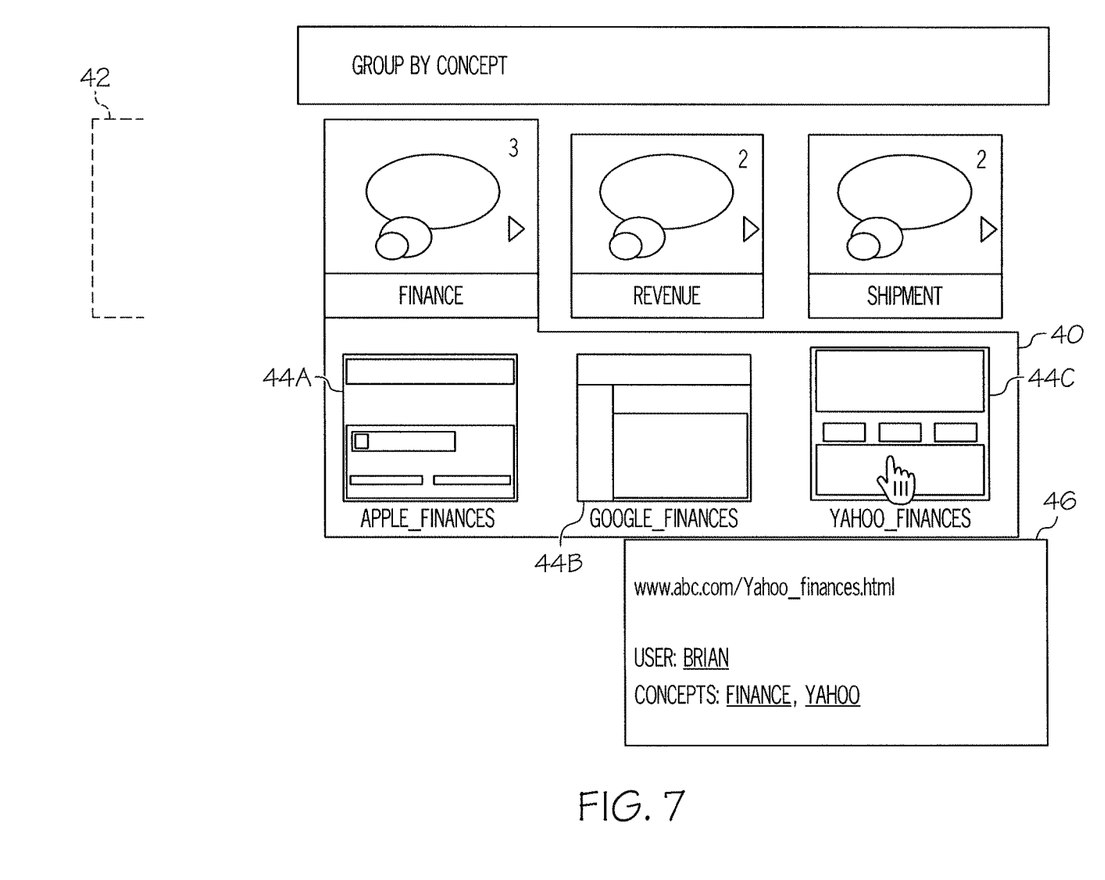
FIG. 7 illustrates another example filtered breadcrumb trail that has been filtered based on a descriptor selection.

FIGS. 6-7 illustrate example filtered breadcrumb trails 30, 40 that have been filtered based on a descriptor selection. In the example of FIG. 6, the host 20 presents a display 32 of descriptors in which the descriptors are grouped by descriptor category (in this case the category being "username"). Responsive to receiving a descriptor selection from one of the users 12 (in this example "BRIAN" is selected), the host 20 presents a filtered breadcrumb trail 30 including only events tagged with the selected descriptor. In this case, the descriptor "BRIAN" applies to "Google_finances.html" (event 22B) and "Yahoo_finances.html" (event 22G) so those are the only two events listed. The events are depicted with images 34A-B. Each of the images 34A-B serves as a link to the media content of events tagged with the selected descriptor. Thus, image 34A links to "Google_finances.html" and image 34B links to "Yahoo_finances.html." Responsive to the user hovering their cursor over a given image 34 a summary 36 of the event corresponding to the image may be presented. A number shown in the corner of each image 32 indicates a quantity of events linked to that user. Thus, Alice is linked to one event, and Brian, Chris and Drew are linked to two events each.

FIG. 7 illustrates another example filtered breadcrumb trail 40 that has been filtered based on a descriptor selection. In the example of FIG. 7, the host 20 presents a display 42 of descriptors in which the descriptors are grouped by descriptor category (in this case the category being "concept"). Responsive to receiving a descriptor selection from one of the users 12 (in this example "FINANCE" is selected), the host 20 presents a filtered breadcrumb trail 40 including only events tagged with the selected descriptor. In this case, the descriptor "FINANCE" applies to "Apple_finances.html" (event 22A), "Google_finances.html" (event 22B) and "Yahoo_finances.html" (event 22G) so those are the only three events 22A, 22B, 22G listed. These events are depicted with images 44A-C. Each of the images 44A-C serves as a link to the media content of events tagged with the selected descriptor. Thus, image 44A links to "Apple_finances.html", image 44B links to "Google_finances.html" and 44C links to "Yahoo_finances.html." In one or more embodiments, responsive to the user hovering their cursor over a given image 44 a summary 46 of the event corresponding to the image is presented. As with FIG. 6, a number shown in the corner of each image 42 indicates a quantity of events linked to that category. Thus, "Finance" is linked to three events, and "Revenue" and "Shipment" are each linked to two events.

In one or more embodiments a user can toggle between author path breadcrumbs (FIG. 3), semantic path breadcrumbs (FIG. 4), and filtered breadcrumb trails (FIGS. 6-7) based on an input on their respective remote computing device 14.

Figure 8:
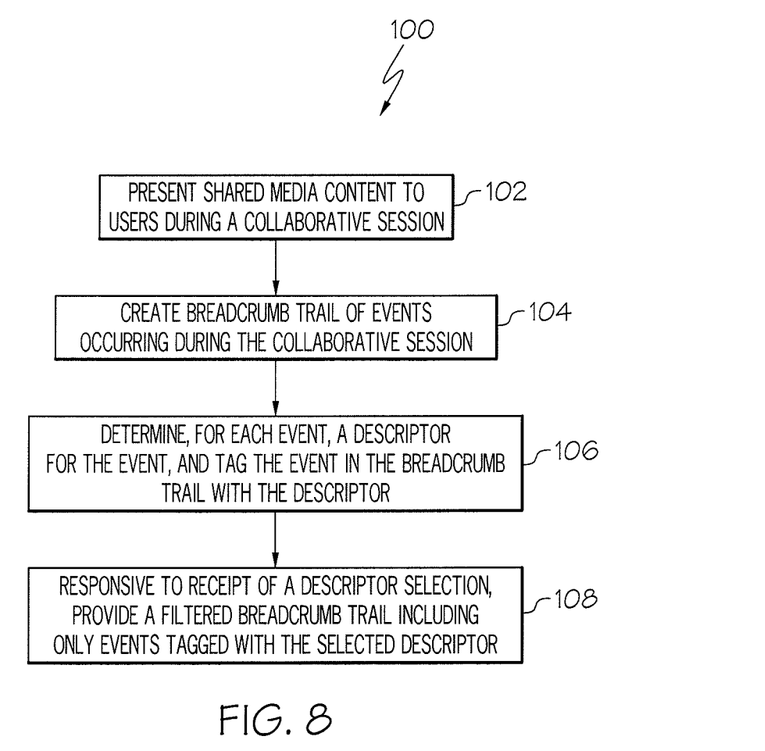
FIG. 8 illustrates a computer-implemented method of presenting a filtered breadcrumb trail.

FIG. 8 illustrates a computer-implemented method 100 that more broadly formulates the embodiments described above. The method is implemented by a computer, such as the collaborative session host 20. The host presents (102) shared media content to the plurality of users 12 during a collaborative session, wherein the session includes a plurality of events 22. A breadcrumb trail 24 of events occurring during the collaborative session is created (104). For each of the events, a descriptor is determined for the event, and the event in the breadcrumb trail is tagged with the descriptor (106). Responsive to receipt of a descriptor selection, a filtered breadcrumb trail including only events tagged with the selected descriptor is presented (108).

In the embodiments described above the shared media content is webpages, and each event corresponds to browsing to a new webpage. However it is understood that many other types of media content could be used. For example, in one or more embodiments the shared media content includes a slide-based presentation and the events correspond to new slides being displayed. The media content in such embodiments may also include other user contributions such as a user annotating a slide (e.g., by highlighting), and a user speaking during presentation of a slide and/or while visiting a website and sharing that speech with the collaborative session via their respective remote computing device 14.

Figure 9:
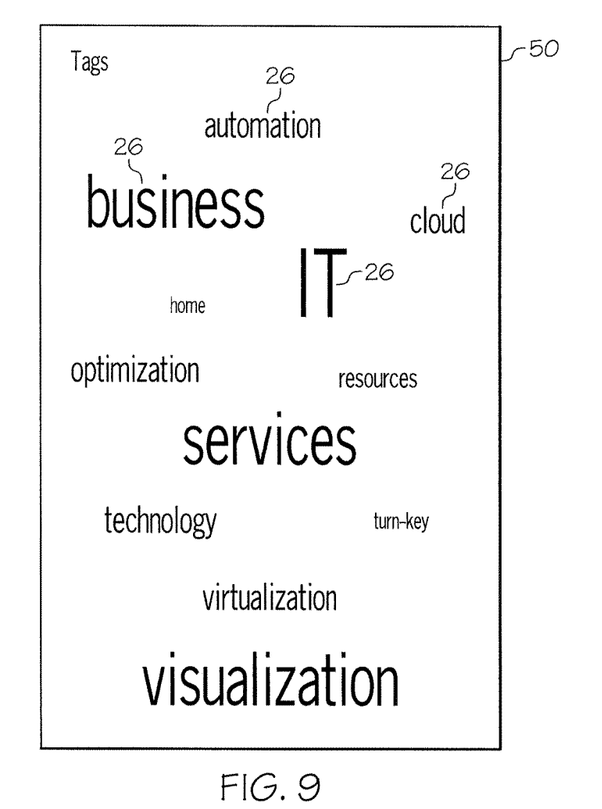
FIG. 9 illustrates an example display of descriptors.
Figure 10:
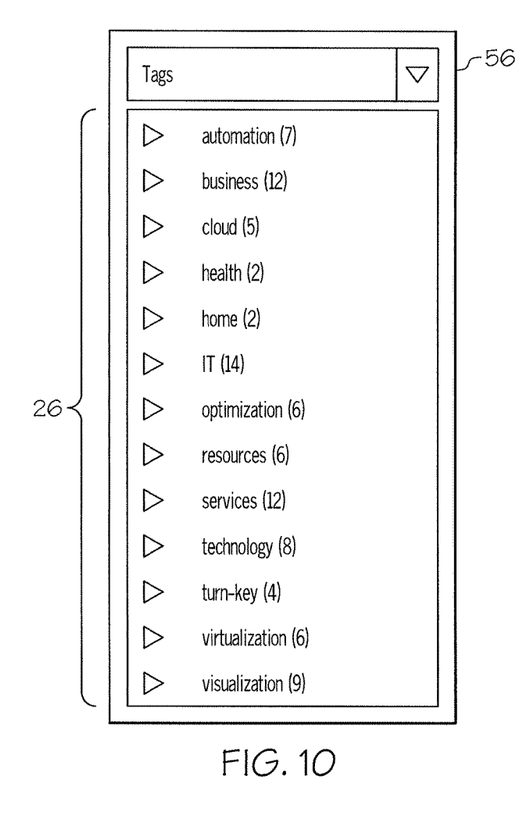
FIG. 10 illustrates another example display of descriptors.

FIGS. 9-10 illustrate example displays 50, 56 that could be used in various embodiments, including the webpage and slide-based presentation embodiments discussed above. The display 50 of FIG. 9 lists a plurality of descriptors 26 (e.g., "automation," "business," "cloud," "IT," etc.). Each of these descriptors (or "tags") is linked to an event (e.g., events 22 of FIG. 2), and its size indicates a quantity of events that it is linked to. Thus, descriptor "IT" is much larger than descriptor "Home," indicating that "IT" has been used to tag more events than "Home."

FIG. 10 illustrates a complementary display 56 in which next to each descriptor 26 is a numeric value is shown parenthesis to indicate how many events the descriptor has been used to tag. Based on a user selecting a descriptor 26 in either display 50 or 56 the host 20 could present a filtered breadcrumb trail. Thus, in one or more embodiments a display of descriptors is presented in which the descriptors are enlarged relative to the quantity of events that they have been used to tag, and the descriptor selection of block 108 (see FIG. 8) is based on a user selecting a descriptor from the display 50 or 56.

In one or more other embodiments, the shared media content is a dataset in a computer resource monitoring tool used to monitor processes in various logical partitions (LPARs) of a mainframe computer. For example, assume that three users 12A-C (in this embodiment Ajay, Ben and Carol) perform the following steps in the following order in such a tool:

Ajay expands LPAR 1 (Descriptors: EXPAND, LPAR1, Ajay);
Ajay sorts jobs descending by CPU % (Descriptors: DESCENDING, CPU %, LPAR1, Ajay);
Carol notices a high CPU % job that has been troublesome before, JOBID=12345, and selects it (Descriptors: SELECT, LPAR1, JOBID, JOBID=12345, Carol);
Ben remembers seeing a similar type of problem in the past in LPAR 2, expands LPAR 2 (Descriptors: EXPAND, LPAR2, Ben);
Ben selects the similar problem item, with JOBID=54321 (Descriptors: SELECT, LPAR2, JOBID, JOBID=54321, Ben);
Ajay recognizes the job class and searches all by JOBCLASS=XYZ. (Descriptors: SEARCH, JOB-CLASS, JOBCLASS=XYZ, Ajay); and
Ajay selects the first result to view it, which is in LPAR1 (Descriptors: SELECT, LPAR1, Ajay).

Figure 11:
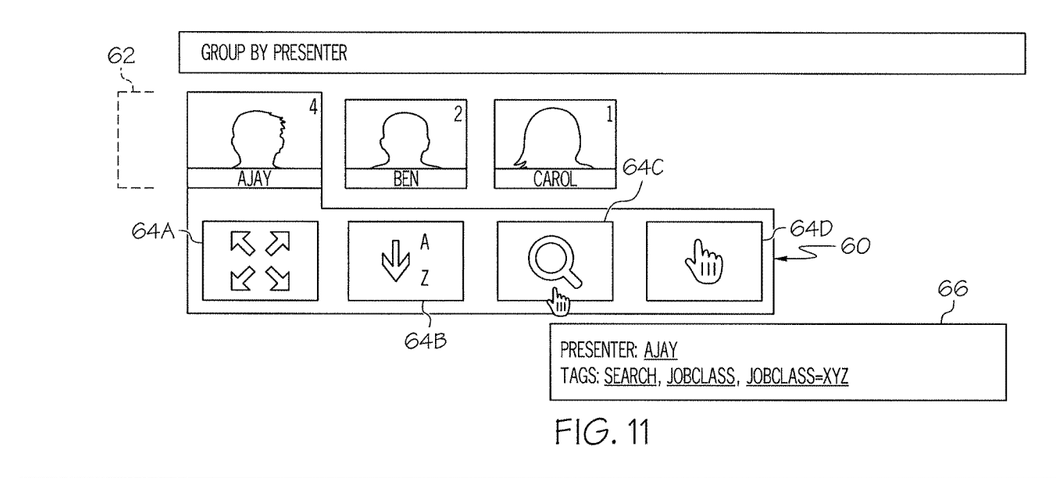
FIG. 11 illustrates another example filtered breadcrumb trail that has been filtered based on a descriptor selection.
Figure 12:
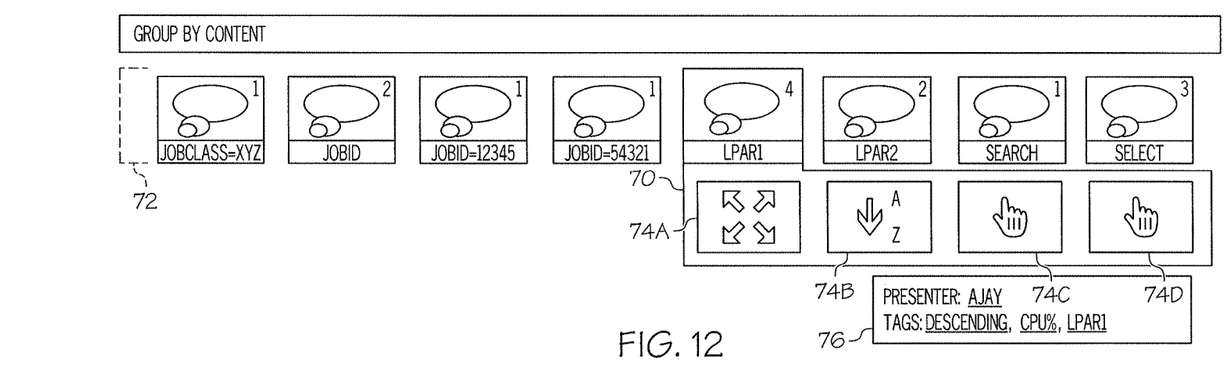
FIG. 12 illustrates yet another example filtered breadcrumb trails that has been filtered based on a descriptor selection.

In this embodiment the presenter path is: Ajay, Ajay, Carol, Ben, Ben, Ajay, Ajay. Thus, Ajay is tagged for four events, Ben is tagged for two events, and Carol is tagged for a single event. FIGS. 11-12 illustrate examples of filtered breadcrumb trails 60, 70 that have been filtered based on a descriptor selection in this embodiment. In these embodiments, the images 64, 74 in the filtered breadcrumb trails 60, 70 are indicative of an action taken during the collaborative session to arrive at the media content of its associated event.

In the example of FIG. 11, the host 20 presents a display 62 of descriptors in which the descriptors are grouped by descriptor category (in this case the category being "username"). Responsive to receiving a descriptor selection from one of the users 12 (in this example "AJAY" is selected), the host 20 presents a filtered breadcrumb trail 60 including only events tagged with the selected descriptor. In the breadcrumb trail 60, image 64A illustrates an "expand" icon indicating Ajay's expansion of LPAR 1. Image 64B illustrates a "sort" icon indicating Ajay's sorting of jobs by CPU %. Image 64C illustrates a "search" icon indicating Ajay searching by JOBID. Image 64D illustrates a "select" icon indicating Ajay's selection of a result. Responsive to the user hovering their cursor over image 64C, a summary 66 of the event corresponding to the image is displayed. A number shown in the corner of each image 32 indicates a quantity of events linked to that user. Thus, Ajay is linked to four events, Ben is linked to two events, and Carol is linked to one event.

FIG. 12 illustrates another example filtered breadcrumb trail 70 that has been filtered based on a descriptor selection. In the example of FIG. 12, the host 20 presents a display 72 of descriptors in which the descriptors are grouped by descriptor category (in this case the category being "concept"). Responsive to receiving a descriptor selection from one of the users 12 (in this example "LPAR1" is selected), the host 20 presents the filtered breadcrumb trail 70 including only events tagged with the selected descriptor. In this case, the descriptor "LPAR1" applies to four events (as discussed above). Each image 74A-D depicts an action taken during the collaborative session to arrive at the media content of its associated event. Responsive to the user hovering their cursor over image 74B, a summary 76 of the event corresponding to the image is shown. Additionally, a number shown in the corner of each image 72 indicates a quantity of events linked to that action.

Figure 13:
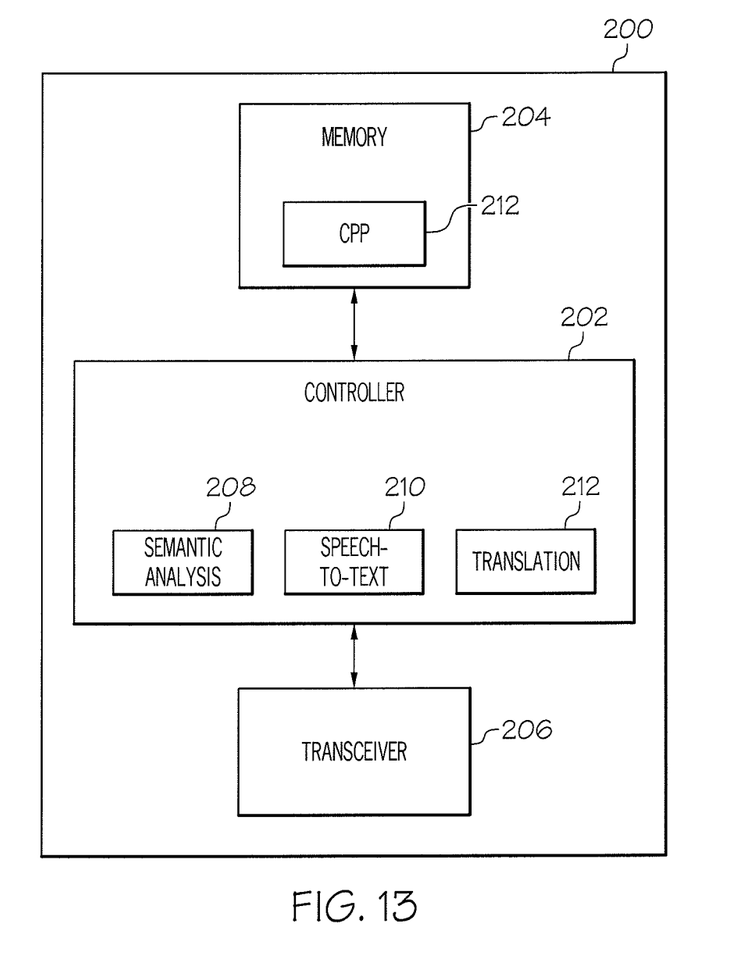
FIG. 13 illustrates an example computing device configured as a collaborative session host.

FIG. 13 illustrates an example computing device 200 configured as the collaborative session host 20, and operative to implement one or more of the embodiments described above. The computing device 200 includes a controller (including one or more control circuits), a computer readable storage medium (shown as memory 204) and a transceiver 206. The transceiver 206 is operative to communicate with the plurality of users 12 via remote computing devices 14 of the plurality of users. The controller 202 is configured to present shared media content to the plurality of users 12 during a collaborative session, wherein the session includes a plurality of events, and to dynamically create a breadcrumb trail of events occurring during the collaborative session. The controller 202 is further configured to dynamically determine, for each of the events, one or more descriptors for the event, and tag the event in the breadcrumb trail with the one or more determined descriptors. Responsive to receiving a descriptor selection from one of the users, the controller 202 is configured present a filtered breadcrumb trail including only events tagged with the selected descriptor. In one or more embodiments the controller may include a semantic analysis unit 208 operative to perform a semantic analysis of the content of a given event to determine relevant descriptive terms for the media content, which the controller 202 can then use as descriptors for the event (e.g., determining descriptors from a visited website or a slide from a slide-based presentation). In one or more embodiments the semantic analysis unit 208 includes Neuro-Linguistic Programming (NLP) features. In the same or other embodiments the controller 202 also includes a speech-to-text unit 210 operative to convert audio shared media content to text form. This may be useful, for example, in embodiments in which the shared media content includes user speech (e.g., a user speaking during presentation of a slide and/or while visiting a website, and sharing that speech with the collaborative session via their respective remote computing device 14). In the same or other embodiments, the controller includes a translation unit 212 operative to translate portions of the shared media content for a user 12.

The memory 204 stores the dynamically created nonfiltered breadcrumb trail, and associated information about its events (e.g., tagged descriptors and images for the filtered breadcrumb trail). The memory 204 may also be used as a cache to store the shared media content of the collaborative session, so that such cached content may be recalled if a user wishes to revisit a previous event. In one or more embodiments, whether a page is retrieved from the cache or is newly obtained is determined by user preference. In one or more embodiments, the memory 204 also includes a computer program product 212 containing computer readable program code operative to configure the computing device 200 as described above.

The disclosed embodiments provide a number of improvements over prior art systems. Consider, for example, that back buttons are commonly used in web browsers to navigate to previous webpages. However, in a multi-presenter collaborative session it is unclear what the intended behaviour of a back button should be. That is, it is unclear if a user clicking "back" should take the user back to their last visited page, or a last visited page of any presenter. Referring to the example of FIG. 2, it would be unclear in the prior art how a back button should behave if Brian clicked on it from the "Yahoo_finances.html" page. The filtered breadcrumb trails discussed above, however, allow a presenter to move back and forth and without the ambiguity discussed above. Thus, in a complex group problem solving setting (such as that of FIGS. 11-12), contributors can easily move back and forth among their shared media content, and revisiting a previously event in the shared media content is efficient and unambiguous.

As described above, the descriptors 26 can be indicative of the media content of its associated event (see FIG. 7), an action taken during the collaborative session to arrive at the media content of its associated event (see FIG. 12), a user having initiated its associated event (see FIGS. 6 and 11), or a user having contributed media content to its associated event (e.g., providing media content once the event is already initiated). Similarly, in one or more embodiments, each link in the filtered breadcrumb trail includes an image depicting either the media content of its associated event (see FIGS. 6-7), or an action taken during a collaborative session to arrive at the media content of its associated event (see FIGS. 11-12). In connection with the archiving features discussed above, responsive to receiving a link selection the host 20 in one or more embodiments re-presents the media content of the event corresponding to the link to the plurality of users 12 (e.g., if a user selects "Yahoo_finances.html" retrieve that page from the cache, or load a new copy, and re-present that page to the users).

Moreover, the embodiments described above are widely applicable to a variety of applications. Although webpage browsing, slide-based presentations, and computer resource monitoring tools have been described, it is understood that these are only non-limiting examples. The filtered breadcrumb trail creation features discussed above could be applied to other shared media content, such as video conferencing, collaborative document creation, or any event-based collaborative session.

The present embodiments may, of course, be carried out in other ways than those specifically set forth herein without departing from essential characteristics of the disclosure. For example, it should be noted that the flowchart and block diagrams in the figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer-implemented method comprising:
   simultaneously presenting shared media content to a plurality of users during a collaborative session, wherein the session includes a plurality of events, and wherein the shared media content comprises a dataset in a computer resource monitoring tool, wherein the computer resource monitoring tool is configured to monitor jobs in one or more logical partitions (LPARs) of a computer;
   creating a breadcrumb trail of events which occur during the collaborative session;
   determining, for each of the events, a descriptor for the event, and tagging the event in the breadcrumb trail with the descriptor, wherein the descriptor indicates a category for the event;
   presenting a first line of icons, each icon corresponding to a respective descriptor of a same type and visually indicating a number of events that are linked to the category represented by the descriptor;
   receiving a descriptor selection via a selection of an icon by a user from the first line;
   responsive to receiving the descriptor selection, presenting a filtered breadcrumb trail that includes events tagged with the selected descriptor and excludes events not tagged with the selected descriptor, as a second line of icons that is parallel to the first line of icons, wherein each icon in the second line corresponds to a separate event and comprises an image indicative of an action performed by the user during the collaborative session to arrive at the media content of the associated event, and wherein the image indicative of the action performed by the user during the collaborative session to arrive at the media content of the associated event comprises one of an expand icon indicating an expansion of the one or more LPARS performed during the collaborative session, and a sort icon indicating a sorting of jobs performed during the collaborative session;

wherein the shared media content that is simultaneously presented during the collaborative session is controlled, at any given time, by whichever one of the plurality of users currently has a presenter role; and wherein each event is tagged with a plurality of descriptors, one of which is an identifier of the user that had the presenter role when the event occurred.

2. The computer-implemented method of claim 1, wherein each descriptor is indicative of one of the following:
the media content of its associated event;
the action taken during the collaborative session to arrive at the media content of its associated event; and
a user that either initiated its associated event or contributed media content to its associated event.

3. The computer-implemented method of claim 1, wherein each icon in the filtered breadcrumb trail comprises a link to the media content of its corresponding event.

4. The computer-implemented method of claim 3:
wherein each icon further depicts the media content of its associated event.

5. The computer-implemented method of claim 3, further comprising:
responsive to receipt of a link selection from one of the users, simultaneously re-presenting the media content of the event corresponding to the link to the plurality of users.

6. The computer-implemented method of claim 1, wherein said determining a descriptor for the event comprises:
performing a semantic analysis of the media content corresponding to the event to determine relevant descriptive terms for the media content; and
using each of the determined descriptive terms as descriptors for the event.

7. The computer-implemented method of claim 1, further comprising:
presenting a display of descriptors in which the descriptors are enlarged relative to the quantity of events that they have been used to tag; and
receiving an additional descriptor selection based on user selection of a descriptor from the display of descriptors.

8. The computer-implemented method of claim 1, further comprising:
presenting a display of the descriptors in which the descriptors are grouped by descriptor category; and
receiving an additional descriptor selection based on user selection of a descriptor from the display of descriptors.

9. The computer-implemented method of claim 3, further comprising:
responsive to a user hovering a cursor over a given link, displaying each descriptor used to tag the event associated with the given link.

10. The computer-implemented method of claim 1, further comprising:

responsive to receipt of a descriptor category selection, providing a consolidated breadcrumb trail in which events for multiple descriptors are provided but are consolidated into groups according to descriptors of the selected descriptor category.

11. The computer-implemented method of claim 1:
wherein said presenting shared media content comprises presenting a slide-based presentation comprising a plurality of predefined slides arranged in a predefined order unless that order is overridden by the user that currently has the presenter role; and
wherein a portion of the events correspond to new slides being displayed during the slide-based presentation.

12. The computer-implemented method of claim 1 further comprising toggling between presenting an author path breadcrumb trail, a semantic path breadcrumb trail, and the filtered breadcrumb trail responsive to receiving user input.

13. A computing device comprising:
control circuitry connected to memory, the control circuitry configured to:
simultaneously present shared media content to a plurality of users via respective computing devices of the plurality of users during a collaborative session, wherein the session includes a plurality of events, and wherein the shared media content comprises a dataset in a computer resource monitoring tool, wherein the computer resource monitoring tool is configured to monitor jobs in one or more logical partitions (LPARs) of a computer;
create a breadcrumb trail of events which occur during the collaborative session;
determine, for each of the events, a descriptor for the event, and tag the event in the breadcrumb trail with the descriptor, wherein the descriptor represents a category for the event;
present a first line of icons, each icon corresponding to a respective descriptor of a same type and visually indicating a number of events that are linked to the category represented by the descriptor;
receive a descriptor selection via a user selection of an icon by a user from the first line;
responsive to receiving the descriptor selection, present a filtered breadcrumb trail that includes events tagged with the selected descriptor and excludes events not tagged with the selected descriptor, as a second line of icons that is parallel to the first line of icons, wherein each icon in the second line corresponds to a separate event and comprises an image indicative of an action performed by the user during the collaborative session to arrive at the media content of the associated event, and wherein the image indicative of the action performed by the user during the collaborative session to arrive at the media content of the associated event comprises one of an expand icon indicating an expansion of the one or more LPARS performed during the collaborative session, and a sort icon indicating a sorting of jobs performed during the collaborative session;
wherein the shared media content that is simultaneously presented during the collaborative session is controlled, at any given time, by whichever one of the plurality of users currently has a presenter role; and
wherein each event is tagged with a plurality of descriptors, one of which is an identifier of the user that had the presenter role when the event occurred.

14. The computing device of claim 13, wherein each descriptor is indicative of one of the following:
the media content of its associated event;
the action taken during the collaborative session to arrive at the media content of its associated event; and
a user that either initiated its associated event or contributed media content to its associated event.

15. The computing device of claim 13, wherein each icon in the filtered breadcrumb trail comprises a link to the media content of its corresponding event.

16. The computing device of claim 15:
wherein each icon further depicts the media content of its associated event.

17. The computing device of claim 15, wherein the control circuitry is further configured to:
responsive to receipt of a link selection from one of the plurality of users, simultaneously re-present the media content of the event corresponding to the link to the plurality of users.

18. The computing device of claim 13, wherein to determine a descriptor for the event, the control circuitry is configured to:
perform a semantic analysis of the media content corresponding to the event to determine relevant descriptive terms for the media content; and
use each of the determined descriptive terms as descriptors for the event.

19. The computing device of claim 13, wherein the control circuitry is further configured to:
present a display of descriptors in which the descriptors are enlarged relative to the quantity of events that they have been used to tag; and
receive an additional descriptor selection based on user selection of a descriptor from the display of descriptors.

20. The computing device of claim 13, wherein the control circuitry is further configured to:
present a display of the descriptors in which the descriptors are grouped by descriptor category; and
receive an additional descriptor selection based on user selection of a descriptor from the display of descriptors.

21. The computing device of claim 15, wherein the control circuitry is further configured to:
responsive to a user hovering a cursor over a given link, display each descriptor used to tag the event associated with the given link.

22. The computing device of claim 13, wherein the control circuitry is further configured to:
responsive to receipt of a descriptor category selection, provide a consolidated breadcrumb trail in which events for multiple descriptors are provided but are consolidated into groups according to descriptors of the selected descriptor category.

23. The computing device of claim 13:
wherein to simultaneously present the shared media content, the control circuitry is configured to present a slide-based presentation comprising a plurality of predefined slides arranged in a predefined order, unless that order is overridden by the user that currently has the presenter role; and
wherein a portion of the events correspond to new slides being displayed during the slide-based presentation.

24. A computer program product comprising:
a non-transitory computer readable storage medium having computer readable program code embodied thereon that, when executed by a processing circuit of a computing device, causes the processing circuit to:
simultaneously present shared media content to a plurality of users during a collaborative session, wherein the session includes a plurality of events, and wherein the shared media content comprises a dataset in a computer resource monitoring tool, wherein the computer resource monitoring tool is configured to monitor jobs in one or more logical partitions (LPARs) of a computer;
create a breadcrumb trail of events which occur during the collaborative session;
determine, for each of the events, a descriptor for the event, and tag the event in the breadcrumb trail with the descriptor, wherein the descriptor represents a category for the event;
present a first line of icons, each icon corresponding to a respective descriptor of a same type and visually indicating a number of events that are linked to the category represented by the descriptor;
receive a descriptor selection via a user selection of an icon by a user from the first line;
present a filtered breadcrumb trail responsive to receiving the descriptor selection, wherein the filtered breadcrumb trail includes events tagged with the selected descriptor and excludes events not tagged with the selected descriptor, and is presented as a second line of icons that is parallel to the first line of icons, wherein each icon in the second line corresponds to a separate event and comprises an image indicative of an action performed by the user during the collaborative session to arrive at the media content of the associated event, and wherein the image indicative of the action performed by the user during the collaborative session to arrive at the media content of the associated event comprises one of an expand icon indicating an expansion of the one or more LPARS performed during the collaborative session, and a sort icon indicating a sorting of jobs performed during the collaborative session;
wherein the shared media content that is simultaneously presented during the collaborative session is controlled, at any given time, by whichever one of the plurality of users currently has a presenter role; and
wherein each event is tagged with a plurality of descriptors, one of which is an identifier of the user that had the presenter role when the event occurred.

25. The computer program product of claim 24, wherein each descriptor is indicative of one of the following:
the media content of its associated event;
the action taken during the collaborative session to arrive at the media content of its associated event; and
a user that either initiated its associated event or contributed media content to its associated event.

26. The computer program product of claim 24, wherein each icon in the filtered breadcrumb trail comprises a link to the media content of its corresponding event.

27. The computer program product of claim 26:
wherein each icon further depicts the media content of its associated event.

28. The computer program product of claim 26, wherein the computer readable program code is further configured to cause the processing circuit to:
responsive to receipt of a link selection from one of the plurality of users, simultaneously re-present the media content of the event corresponding to the link to the plurality of users.

29. The computer program product of claim 24, wherein to determine a descriptor for the event, the computer program product code is further configured to cause the processing circuit to:
  perform a semantic analysis of the media content corresponding to the event to determine relevant descriptive terms for the media content; and
  use each of the determined descriptive terms as descriptors for the event.

30. The computer program product of claim 24, wherein the computer readable program code is further configured to cause the processing circuit to:
  present a display of descriptors in which the descriptors are enlarged relative to the quantity of events that they have been used to tag; and
  receive an additional descriptor selection based on user selection of descriptor from the display of descriptors.

31. The computer program product of claim 24, wherein the computer readable program code is further configured to cause the processing circuit to:
  present a display of the descriptors in which the descriptors are grouped by descriptor category; and
  receive an additional descriptor selection based on user selection of a descriptor from the display of descriptors.

32. The computer program product of claim 26, wherein the computer readable program code is further configured to cause the processing circuit to:
  responsive to a user hovering a cursor over a given link, display each descriptor used to tag the event associated with the given link.

33. The computer program product of claim 24, wherein the computer readable program code is further configured to cause the processing circuit to:
  responsive to receipt of a descriptor category selection, provide a consolidated breadcrumb trail in which events for multiple descriptors are provided but are consolidated into groups according to descriptors of the selected descriptor category.

\* \* \* \* \*